(12) United States Patent
Eavenson, Sr. et al.

(10) Patent No.: US 10,155,537 B2
(45) Date of Patent: Dec. 18, 2018

(54) UTILITY VEHICLE

(71) Applicant: MTD PRODUCTS INC, Valley City, OH (US)

(72) Inventors: Jimmy N. Eavenson, Sr., Aurora, OH (US); Adam Woodrum, Wakeman, OH (US); Jonathan Prybor, Cleveland, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 15/168,945

(22) Filed: May 31, 2016

(65) Prior Publication Data

US 2016/0347364 A1 Dec. 1, 2016

Related U.S. Application Data

(60) Provisional application No. 62/168,265, filed on May 29, 2015.

(51) Int. Cl.
*B62D 9/00* (2006.01)
*B62D 55/065* (2006.01)
(Continued)

(52) U.S. Cl.
CPC ........... *B62D 9/002* (2013.01); *B62D 7/1509* (2013.01); *B62D 11/003* (2013.01); *B62D 21/183* (2013.01); *B62D 55/065* (2013.01)

(58) Field of Classification Search
CPC .............................. B62D 9/002; B62D 7/1509
See application file for complete search history.

(56) References Cited

U.S. PATENT DOCUMENTS

| | | |
|---|---|---|
| 1,836,446 A | 12/1931 | Christie |
| 2,719,062 A | 9/1955 | Arps |

(Continued)

FOREIGN PATENT DOCUMENTS

| | | |
|---|---|---|
| DE | 1200144 | 9/1965 |
| EP | 0578504 | 2/1997 |

(Continued)

OTHER PUBLICATIONS

US 9,008,928, 04/2015, Oishi (withdrawn)
(Continued)

*Primary Examiner* — Kevin Hurley
(74) *Attorney, Agent, or Firm* — Wegman, Hessler & Vanderburg (57) ABSTRACT

A utility vehicle includes a frame, a power source, and a plurality of steerable structures. Ground engaging members are connected to the steerable structures. An operator seating area includes a steering control and a speed control. Controllers receive input from the steering control and the speed control. Motors drive the ground engaging members at different speeds and in different directions. A controller integrates a steering input with a speed input to effect rotation of the steerable structures and effect rotation of the ground engaging members. The steering control, speed control, controllers, steerable structures, and motors are configured to work together to control the rotational speed of all of the ground engaging members based upon a steering angle input and the lateral side the ground engaging member is connected to. Other examples include braking mechanisms, adjustable track width, and a sealed tubular frame.

9 Claims, 10 Drawing Sheets

(51) Int. Cl.
*B62D 7/15* (2006.01)
*B62D 11/00* (2006.01)
*B62D 21/18* (2006.01)

(56) References Cited

U.S. PATENT DOCUMENTS

| | | | |
|---|---|---|---|
| 2,779,636 A | 1/1957 | Allen |
| 3,183,016 A | 5/1965 | Gustafsson |
| 3,216,520 A | 11/1965 | Blonsky |
| 3,435,908 A | 4/1969 | Oldenburg |
| 3,664,449 A | 5/1972 | Vardell |
| 3,666,034 A | 5/1972 | Stuller et al. |
| 3,744,583 A | 7/1973 | Bedard |
| 3,756,335 A * | 9/1973 | Eisele | B60K 1/02 180/6.28 |
| 3,789,942 A | 2/1974 | Kowalik |
| 3,826,388 A | 7/1974 | Oldenburg |
| 3,860,079 A | 1/1975 | Hoffman |
| 3,888,132 A | 6/1975 | Russ, Sr. |
| 3,933,213 A | 1/1976 | Trowbridge |
| 3,938,605 A | 2/1976 | Koch |
| 3,938,606 A | 2/1976 | Yancey |
| 3,948,331 A | 4/1976 | Esch |
| 4,003,608 A | 1/1977 | Carter |
| 4,043,417 A | 8/1977 | Orpana |
| 4,166,511 A | 9/1979 | Stedman |
| 4,202,564 A | 5/1980 | Strader |
| 4,221,272 A | 9/1980 | Kell |
| 4,304,313 A | 12/1981 | van der Lely |
| 4,325,443 A | 4/1982 | Fischer |
| 4,378,133 A | 3/1983 | Trautwein |
| 4,458,955 A | 7/1984 | Webb |
| 4,462,480 A | 7/1984 | Yasui |
| 4,501,452 A | 2/1985 | Huang |
| 4,513,833 A | 4/1985 | Sheldon |
| 4,566,553 A | 1/1986 | McCutcheon |
| 4,618,015 A | 10/1986 | Yochum |
| 4,683,970 A | 8/1987 | Smith |
| 4,706,769 A | 11/1987 | Latourelle |
| 4,953,919 A | 9/1990 | Langford |
| 4,987,965 A | 1/1991 | Bourret |
| 5,258,912 A * | 11/1993 | Ghoneim | B60L 15/2036 180/6.2 |
| 5,273,126 A | 12/1993 | Reed |
| 5,316,381 A | 5/1994 | Isaacson |
| 5,318,141 A | 6/1994 | Hansen |
| 5,323,866 A * | 6/1994 | Simard | B60K 1/02 180/234 |
| 5,372,212 A | 12/1994 | Davis |
| 5,393,134 A | 2/1995 | Oertley |
| 5,409,075 A | 4/1995 | Nieman |
| 5,409,305 A | 4/1995 | Nagorcka |
| 5,575,347 A | 11/1996 | Uchibaba |
| 5,622,234 A | 4/1997 | Nagorcka |
| 5,727,643 A | 3/1998 | Kawano |
| 5,791,429 A | 8/1998 | Bergman |
| 5,860,486 A | 1/1999 | Boivin et al. |
| 5,899,541 A | 5/1999 | Ying |
| 5,899,543 A | 5/1999 | Lykken |
| RE36,284 E | 8/1999 | Kelderman |
| 5,938,301 A | 8/1999 | Hostetler |
| 5,975,226 A | 11/1999 | Matsumoto |
| 5,988,775 A | 11/1999 | Nordberg |
| 6,000,766 A | 12/1999 | Takeuchi |
| 6,006,847 A | 12/1999 | Knight |
| 6,074,025 A | 6/2000 | Juncker |
| 6,123,399 A | 9/2000 | Snyder |
| 6,135,220 A | 10/2000 | Gleasman |
| 6,164,399 A | 12/2000 | Bays |
| 6,199,646 B1 | 3/2001 | Tani |
| 6,241,327 B1 | 6/2001 | Gleasman |
| 6,253,867 B1 | 7/2001 | Lillbacka |
| 6,260,465 B1 | 7/2001 | Zonak |
| 6,289,995 B1 | 9/2001 | Fuller |
| 6,450,280 B1 | 9/2002 | Pepka |
| 6,485,115 B1 | 11/2002 | Egle |
| 6,547,345 B2 | 4/2003 | Phely |
| 6,595,603 B2 | 7/2003 | Rutz |
| 6,615,939 B1 | 9/2003 | Karales |
| 6,655,482 B2 | 12/2003 | Simmons |
| 6,733,093 B2 | 5/2004 | Deland |
| 6,807,466 B2 * | 10/2004 | Strothmann | B62D 7/1509 701/1 |
| 6,810,975 B2 | 11/2004 | Nagorcka |
| 6,840,338 B2 | 1/2005 | Bowers |
| 6,860,571 B2 | 3/2005 | Scheetz |
| 6,892,838 B2 | 5/2005 | Bowers |
| 6,904,986 B2 | 6/2005 | Brazier |
| 6,904,993 B1 * | 6/2005 | Rinck | B60K 17/356 180/197 |
| 6,926,108 B1 | 8/2005 | Polakowski |
| 6,962,219 B2 | 11/2005 | Hauser |
| 7,017,688 B2 | 3/2006 | Bowers |
| 7,131,508 B2 | 11/2006 | Brazier |
| 7,267,414 B2 | 9/2007 | Scheetz |
| 7,308,958 B2 * | 12/2007 | Tamor | B60K 6/46 180/65.1 |
| 7,328,760 B2 | 2/2008 | Inaoka |
| 7,367,637 B2 | 5/2008 | Gleasman |
| 7,416,266 B2 | 8/2008 | Soucy |
| 7,464,785 B2 * | 12/2008 | Spark | B60T 8/24 180/236 |
| 7,478,688 B2 | 1/2009 | Ki |
| 7,520,348 B2 | 4/2009 | Bergsten |
| 7,552,785 B2 | 6/2009 | Tuhy |
| 7,562,727 B1 | 7/2009 | Hoffart |
| 7,575,289 B2 | 8/2009 | Sugihara |
| 7,597,161 B2 | 10/2009 | Brazier |
| 7,641,006 B2 | 1/2010 | Scheetz |
| 7,644,788 B2 | 1/2010 | Scheetz |
| 7,673,711 B1 | 3/2010 | Berg |
| 7,677,344 B2 | 3/2010 | Medina |
| 7,708,092 B2 | 5/2010 | Després |
| 7,784,884 B2 | 8/2010 | Soucy |
| 7,914,022 B2 | 3/2011 | Ruebusch |
| 7,992,659 B2 | 8/2011 | Schaedler |
| 8,002,365 B2 | 8/2011 | Jacobsen |
| 8,011,458 B2 | 9/2011 | Hauser |
| 8,083,242 B2 | 12/2011 | Brazier |
| 8,104,846 B2 | 1/2012 | Porubcansky |
| 8,152,248 B2 | 4/2012 | Brazier |
| 8,430,188 B2 | 4/2013 | Hansen |
| 8,474,841 B2 | 7/2013 | Ruebusch |
| 8,573,348 B2 * | 11/2013 | Cantemir | B60K 6/387 180/246 |
| 8,579,065 B2 | 11/2013 | Bergsten |
| 8,630,770 B2 * | 1/2014 | Matsumoto | B60L 15/2036 701/41 |
| 8,701,801 B2 * | 4/2014 | Itou | B60K 7/0007 180/234 |
| 8,746,815 B2 | 6/2014 | Reshad |
| 8,783,390 B2 * | 7/2014 | Maeda | B60G 7/008 180/242 |
| 8,855,861 B2 | 10/2014 | Goebel |
| 9,008,915 B2 | 4/2015 | Kang |
| 9,566,858 B2 * | 2/2017 | Hicke | B60K 11/04 |
| 9,586,634 B2 | 3/2017 | Buchanan |
| 9,884,662 B2 | 2/2018 | Eavenson, Sr. |
| 2002/0153188 A1 | 10/2002 | Brandt et al. |
| 2003/0180370 A1 | 9/2003 | Lesniak |
| 2004/0099451 A1 | 5/2004 | Nagorcka |
| 2004/0244349 A1 | 12/2004 | Meier |
| 2005/0035655 A1 | 2/2005 | Beckstrom |
| 2005/0077984 A1 | 4/2005 | Lee |
| 2005/0248214 A1 | 11/2005 | Sugihara |
| 2006/0180370 A1 | 8/2006 | Polakowski |
| 2009/0278403 A1 | 11/2009 | Canossa |
| 2009/0308669 A1 | 12/2009 | Vos |
| 2010/0012399 A1 | 1/2010 | Hansen |
| 2010/0060075 A1 | 3/2010 | Hansen |
| 2010/0139994 A1 | 6/2010 | Hansen |
| 2010/0307843 A1 * | 12/2010 | Lawson, Jr. | B60K 17/356 180/6.48 |

(56) References Cited

U.S. PATENT DOCUMENTS

| | | |
|---|---|---|
| 2012/0161511 A1 | 6/2012 | Brazier |
| 2012/0242142 A1 | 9/2012 | Kautsch |
| 2013/0126196 A1 | 5/2013 | Rosenboom |
| 2013/0192905 A1 | 8/2013 | Janzen |
| 2014/0175865 A1 | 6/2014 | Korus |
| 2014/0288763 A1 | 9/2014 | Bennett |
| 2014/0305715 A1* | 10/2014 | Makino .............. B60L 15/2036 180/6.24 |
| 2015/0134202 A1 | 5/2015 | Dawson et al. |

FOREIGN PATENT DOCUMENTS

| | | |
|---|---|---|
| JP | 07205852 | 8/1995 |
| JP | 10129544 | 5/1998 |
| JP | 3937643 | 6/2007 |
| KR | 1020010078749 | 8/2001 |
| WO | 9311022 | 6/1993 |
| WO | 2003059720 | 7/2003 |
| WO | WO 03/059720 A1 | 7/2003 |
| WO | 2005101945 | 11/2005 |
| WO | WO 2005/101945 A2 | 11/2005 |
| WO | WO 2005/101945 A3 | 11/2005 |
| WO | 2010046905 | 4/2010 |
| WO | WO 2010/046905 A1 | 4/2010 |
| WO | 2014008378 | 1/2014 |

OTHER PUBLICATIONS

International Search Report and Written Opinion dated Dec. 7, 2016 for PCT/US2016/035025 filed May 31, 2016.
Final Office Action dated Jul. 12, 2016 for related U.S. Appl. No. 14/412,285.
International Search Report and Written Opinion dated Oct. 11, 2013 for related PCT/US2013/049278.
International Search Report and Written Opinion dated Oct. 7, 2013 for related PCT/US2013/049289.
International Search Report and Written Opinion dated Dec. 5, 2014 for related PCT/US2014/055424.
International Search Report and Written Opinion dated Dec. 7, 2016 for related PCT/US2016/035025.
International Search Report and Written Opinion dated Nov. 5, 2015 for related PCT/US2015/046266.
Notice of Allowance dated Jan. 4, 2017 for related U.S. Appl. No. 14/484,993.
Office Action dated Jan. 29, 2016 for related U.S. Appl. No. 14/412,133.
Office Action dated Nov. 29, 2016 for related U.S. Appl. No. 14/484,899.
Office Action dated Feb. 8, 2016 for related U.S. Appl. No. 14/412,285.
Office Action dated Apr. 1, 2017 for related CN App. No. 201480050347.5.
Office Action dated Apr. 14, 2016 for related U.S. Appl. No. 14/724,172.
Office Action dated May 27, 2016 for related U.S. Appl. No. 14/484,993.
Notice of Allowance dated Sep. 21, 2017 for related U.S. Appl. No. 14/484,899; (pp. 1-7).
Corrected Notice of Allowability dated Nov. 8, 2017 for related U.S. Appl. No. 14/484,899; (pp. 1-2).
Notice of Allowance dated Nov. 20, 2017 for related U.S. Appl. No. 15/450,896; (pp. 1-6).
Office Action dated Jan. 24, 2018 for related U.S. Appl. No. 15/381,003; (pp. 1-13).
Office Action dated Feb. 5, 2018 for related CN App. No. 201480050347.5.
First Action Interview Pilot Program Pre-Interview Communication dated Jul. 12, 2018 for U.S. Appl. No. 15/890,322; (pp. 1-4).
First Action Interview Pilot Program Pre-Interview Communication dated Jul. 12, 2018 for U.S. Appl. No. 15/890,335; (pp. 1-4).
Notice of Allowanace dated Sep. 26, 2018 for U.S. Appl. No. 15/890,322 (pp. 1-8).
Notice of Allowance dated Sep. 25, 2018 for U.S. Appl. No. 15/890,335 (pp. 1-8).

* cited by examiner

UTILITY VEHICLE

CROSS-REFERENCE TO RELATED APPLICATIONS

This application claims the benefit of U.S. Provisional Application No. 62/168,265, filed May 29, 2015, the entire disclosure of which is hereby incorporated herein by reference.

BACKGROUND

1. Field of the Disclosure

The present disclosure is directed to a utility vehicle, and more particularly, to a utility vehicle capable of off-road travel as well as having a load-carrying capacity.

2. Description of Related Art

Utility vehicles (UVs) and similar utility machines (UMs) are available for a variety of industries and usages, but they have some limitations. These machines are non-highway and are generally off-road and therefore subject to a variety of terrain, ambient, environmental and load conditions which cannot be adequately addressed with currently available vehicles. For example, many types of off-road vehicles are targeted for the fun and adventurous experience such as driving on sand dunes or traversing rocks and canyons in a recreational manner. While these recreational vehicles are highly mobile, they generally do not provide significant utility or load-carrying capabilities. Other types of off-road utility vehicles are workhorse-type vehicles that are low-speed, high-utility configured to transport heavy loads for landscaping, or the like, over ground that is not road-quality.

Frames and chassis of the UVs/UMs are typically made from metallic or composite structural components, but these generally do not provide buoyancy. Unless a speed/steering compensating control system is used, turning maneuvers can cause tire slippage or spinning, with associated pushing or plowing.

SUMMARY

Advantages of the present disclosure will become more apparent to those skilled in the art from the following description of the embodiments of the disclosure which have been shown and described by way of illustration. As will be realized, the described methods and apparatus are capable of other and different embodiments, and their details are capable of modification in various respects.

According to one aspect of the subject application, a utility vehicle is provided. The utility vehicle includes a frame that includes two opposing lateral sides. The utility vehicle also includes a power source connected to the frame and a plurality of steerable structures rotatably connected to the frame. The utility vehicle further includes a plurality of ground engaging members operatively connected to the plurality of steerable structures. The utility vehicle still further includes an operator seating area, where a steering control and a speed control for controlling the plurality of ground engaging members are located. The utility vehicle also includes a plurality of controllers configured to receive input from the steering control and the speed control. The utility vehicle further includes a plurality of motors connected to the plurality of steerable structures, wherein the motors are configured to drive the plurality of ground engaging members at different speeds and in different directions. At least one of the plurality of controllers is configured to integrate a steering input received by the steering control with a speed input received by the speed control to effect rotation of the plurality of steerable structures and effect rotation of the plurality of ground engaging members. The steering control, speed control, plurality of controllers, plurality of steerable structures, and plurality of motors are configured to work together to control the rotational speed of all of the plurality of ground engaging members based upon a steering angle input to the steering control and based upon which of the opposing lateral sides a particular ground engaging member of the plurality of ground engaging members is connected.

According to another aspect of the subject invention, a utility vehicle is provided. The utility vehicle includes a frame that includes two opposing lateral sides. The utility vehicle also includes a power source connected to the frame and a plurality of steerable structures rotatably connected to the frame. The utility vehicle further includes a plurality of ground engaging members operatively connected to the plurality of steerable structures. The utility vehicle still further includes a plurality of braking mechanisms connected to the plurality of steerable structures. The plurality of braking mechanisms are configured to apply a braking force to the plurality of ground engaging members. The utility vehicle still further includes an operator seating area, where a steering control and a speed control for controlling the plurality of ground engaging members are located. The utility vehicle also includes a plurality of controllers configured to receive input from the steering control and the speed control. The utility vehicle further includes a plurality of motors connected to the plurality of steerable structures, wherein the motors are configured to drive the plurality of ground engaging members at different speeds and in different directions. At least one of the plurality of controllers is configured to integrate a steering input received by the steering control with a speed input received by the speed control to effect rotation of the plurality of steerable structures and effect rotation of the plurality of ground engaging members. The steering control, speed control, plurality of controllers, plurality of steerable structures, and plurality of motors are configured to work together to effect Ackermann steering on all of plurality of ground engaging members. Half of the plurality of ground engaging members are located on one of the opposing lateral sides and experience a braking force when on an inner side of a turning operation.

According to another aspect of the subject application, a utility vehicle is provided. The utility vehicle includes a frame that includes two opposing lateral sides. The utility vehicle also includes a power source connected to the frame and a plurality of steerable structures rotatably connected to the frame. The utility vehicle further includes a plurality of ground engaging members operatively connected to the plurality of steerable structures. The utility vehicle still further includes an operator seating area, where a steering control and a speed control for controlling the plurality of ground engaging members are located. The utility vehicle also includes a plurality of controllers configured to receive input from the steering control and the speed control. The utility vehicle further includes a plurality of motors connected to the plurality of steerable structures, wherein the motors are configured to drive the plurality of ground engaging members at different speeds and in different directions. At least one of the plurality of controllers is configured to integrate a steering input received by the steering control with a speed input received by the speed control to effect rotation of the plurality of steerable structures and effect rotation of the plurality of ground engaging members. A number of ground contacting members are located on both of the two opposing lateral sides and a track width of the utility vehicle is adjustable.

According to another aspect of the subject application, a utility vehicle is provided. The utility vehicle includes a frame that includes high-strength low-alloy sealed tubular members. The utility vehicle also includes a power source connected to the frame and a plurality of steerable structures rotatably connected to the frame. The utility vehicle further includes a plurality of ground engaging members operatively connected to the plurality of steerable structures. The utility vehicle still further includes a plurality of braking mechanisms connected to the plurality of steerable structures. The plurality of braking mechanisms are configured to apply a braking force to the plurality of ground engaging members. The utility vehicle also includes an operator seating area, wherein a steering control and a speed control for controlling the ground engaging members are located within the operator seating area.

BRIEF DESCRIPTION OF SEVERAL VIEWS OF THE DRAWINGS

These and other features of the present disclosure, and their advantages, are illustrated specifically in embodiments of the disclosure now to be described, by way of example, with reference to the accompanying diagrammatic drawings, in which.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION

A new design for an amphibious all-wheel drive/all-wheel steering utility vehicle is provided. The utility vehicle will provide off-highway transportation for two $95^{th}$ percentile adult males (or the equivalent) and cargo on a platform which provides amphibious capability, outstanding maneuverability, superb stability and traction using an efficient hybrid-electric or hydrostatic traction drive system. Power can be provided by an efficient and low-emission spark or compression-ignition engines or stored energy devices, including internal combustion engines, hybrid-electric engines, electric engines, and the like.

Figure 1:
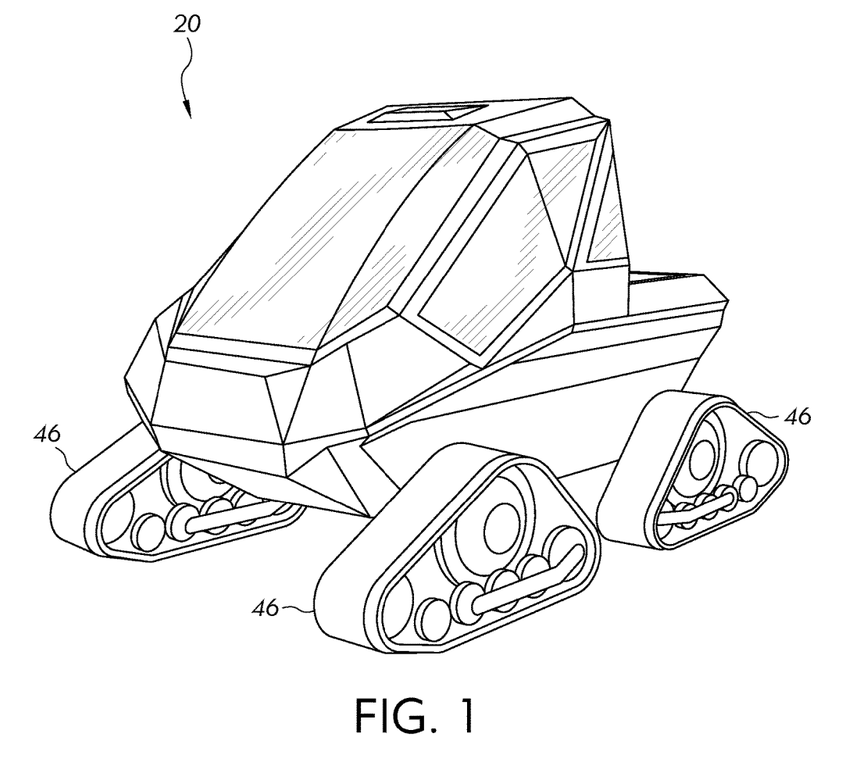
FIG. 1 is a perspective view of an example utility vehicle according to at least one embodiment of the present disclosure showing a track assembly as a ground engaging member.

Turning to FIG. 1, a utility vehicle 20 includes a frame 24 (best seen in FIG. 2) providing a base upon which individual components of the utility vehicle 20 can be mounted. In one example, the frame 24 can be constructed of tubular members 26 comprising high-strength low-alloy steel (HSLA). HSLA frame members can provide more desirable mechanical properties, increased resistance to corrosion, and lighter weight in cross-section when compared to more common steel compositions such as carbon steel. The tubular members 26 can be sealed in order to increase the buoyancy of the utility vehicle 20. Tubular members 26 can also provide convenient protected spaces for routing wire harnesses and tubing throughout the utility vehicle 20.

Figure 2:
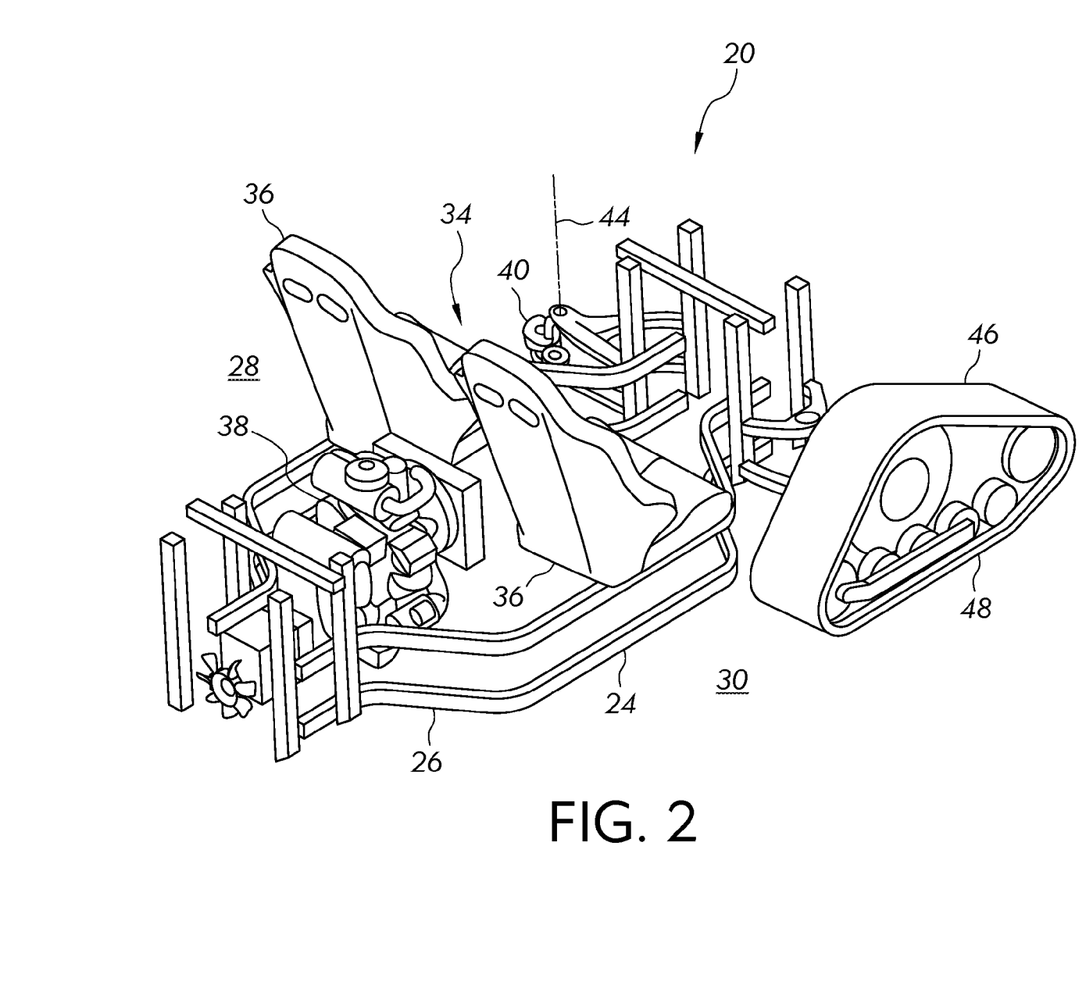
FIG. 2 is a perspective view of the utility vehicle of FIG. 1 with a number of components removed in order to detail a frame construction.

Turning to FIG. 2, the frame includes two opposing lateral sides 28, 30. For example, the lateral sides 28, 30 can be the left and right sides of the utility vehicle 20. The utility vehicle 20 also includes an operator seating area 34, generally shown in FIG. 2 as a pairing of two seats 36. It is to be understood that the operator seating area 34 can be on the left or right sides of the vehicle centerline 74 and can be further enclosed with a roof, a floor, doors, instrument panel, etc., though these elements are not shown in FIG. 2 for the sake of showing the arrangement of the main elements of the utility vehicle 20. As best seen in the schematic view of FIG. 5A, the operator seating area 34 further includes a steering control and a speed control for controlling travel speed and direction of the utility vehicle 20.

The utility vehicle 20 includes a power source 38 connected to the frame 24. Any suitable power source can be used with the utility vehicle 20 including, but not limited to, mechanical power devices such as spark-ignition (gasoline) or compression-ignition (diesel) internal combustion engines or electric power provided by stored energy devices such as batteries, fuel cells, etc. Regardless of the type, the power source 38 provides energy to propel the utility vehicle 20 and supply power to other ancillary systems as needed.

Continuing with FIG. 2, the utility vehicle 20 includes a plurality of steerable structures 40 rotatably connected to the frame 24. Each steerable structure 40 has a ground engaging member 44 operatively connected to it, such that when the steerable structure 40 is rotated relative to the frame 24, the ground engaging member 44 rotates with the steerable structure 40. In most examples, the steerable structure 40 is configured to rotate about a substantially vertical axis 44. Only one steerable structure 40 is shown in FIG. 2, however, it is to be understood that one steerable structure 40 can be located at each traditional corner of the utility vehicle 20.

Figure 3:
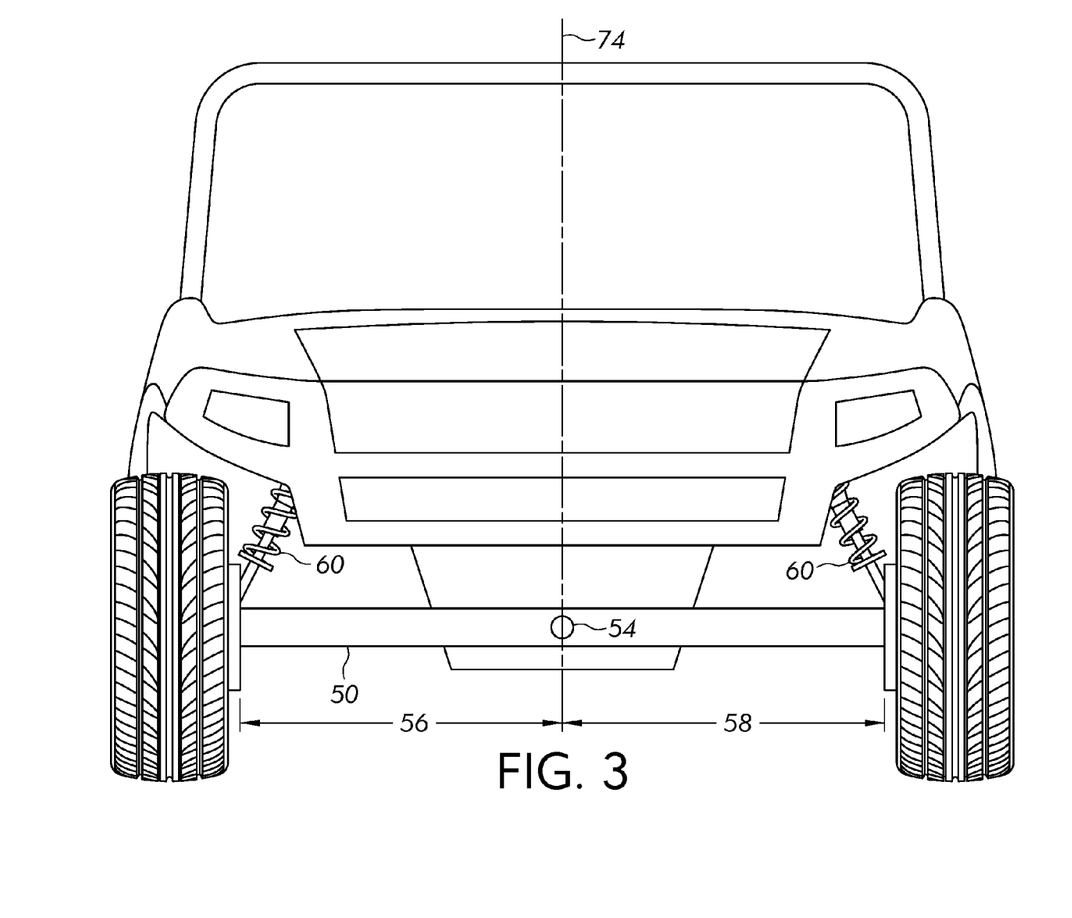
FIG. 3 is a simplified view of an articulating beam axle as used on the utility vehicle of FIG. 1 showing wheel/tire provisions for the ground engaging member.

The utility vehicle 20 also includes a plurality of ground engaging members 46 that are operatively connected to the plurality of steerable structures 40, typically one ground engaging member 46 per each steerable structure 40. As shown in FIGS. 1 and 2, one example of a ground engaging member 46 is a track assembly 48. Any suitable track assembly can be used; one example is described in U.S.

patent application Ser. No. 14/724,172. Other examples of ground engaging members include, but are not limited to, pneumatic tires and non-pneumatic tires as shown in FIG. 3. In one example, the utility vehicle 20 includes wheel/tires or track assemblies to support and transfer loading of the utility vehicle 20 through suspension elements to the terrain it traverses.

In another example, the utility vehicle 20 includes pneumatic wheel/tires providing large terrain contact areas and internal air/nitrogen volumes to create the buoyancy necessary for floatation of the utility vehicle 20. In yet another example, the utility vehicle 20 includes non-pneumatic wheel/tires providing many of the features of pneumatic wheel/tires but with high axial stiffness, increased terrain contact areas, and "no-flat" performance.

In still another example, the utility vehicle 20 includes track assemblies providing increased ground contact area (fore-and-aft) exhibiting lower ground pressure, high axial stiffness, adjustable radial stiffness and spring rates, and no-flat performance.

Pneumatic tire(s) of a wheel assembly or non-pneumatic tire(s) of a wheel assembly are used to provide traction drive for the utility vehicle 20 in some configurations. Pneumatic tires provide deflections radially, laterally (axially), and torsionally whereas non-pneumatic typically provide high axial stiffness, whereas tracks have high lateral & torsional stiffness with varying amounts of radial stiffness. The utility vehicle 20 can include both pneumatic and non-pneumatic tires as well as track assemblies as ground engaging members to provide traction between the vehicle and the ground, or any combination thereof. The pneumatic tires provide relatively large terrain contact areas and large internal volumes for air/nitrogen, with the additional benefit of buoyancy. Some current utility vehicles utilize non-pneumatic tires that are designed to match the radial and torsional characteristics of pneumatic tires, but with higher lateral stiffness (this minimizes slip angle during turning and lateral loading) and a larger terrain contact patch. One advantage of replacing the pneumatic and non-pneumatic tires with track assemblies 48 is to eliminate slip angle during turning and lateral loading, which increases the areas of terrain contact (therefore improving traction) and a decrease in ground contact pressure. The weight of the utility vehicle 20 is spread out over a significantly larger area using track assemblies, such that the ground contact pressure can be reduced eight-to-ten-fold when compared to pneumatic or non-pneumatic tire use. Track assemblies, or tracked drive systems, typically resolve performance issues such as limited traction, minimal floatation and terrain deformation that could limit machine utilization with restricted or limited utilization of attachments. These limitations have a direct effect on machine directional and steering control, stability, flexibility, and functionality with attachments connected to the utility vehicle 20.

A variety of suspension schemes can be used to help smooth the ride of the utility vehicle 20. As shown in FIG. 3, suspensions employing an axle comprising an articulating beam 50 are particularly useful in off-road applications for utility vehicles because they offer great strength and load capacity, high lateral stability, good ride comfort, and only tend to raise load height minimally when small changes in the terrain (bumps, dips, etc.) are encountered. Articulating beam axles are hollow assemblies with a pivot point 54, about which there are portions 56, 58 of the articulating beam 50 on each side of the pivot point 54. While not shown, each end of the articulating beam 50 can incorporate a yoke that accepts a complimentary steerable structure 40. Pivoting of the articulating beam 50 allows for wheel/tire and tracks movements with bounce (jounce) and rebound forces being controlled by adjustable mechanical or air springs and shock-absorber assemblies 60. Other examples of suspension equipment can include adjustable mechanical springs (coil, leaf, torsion, and the like) and hydraulic or pneumatic spring devices. In another example, the utility vehicle 20 includes manually or power adjustable suspension elements.

Figure 4:
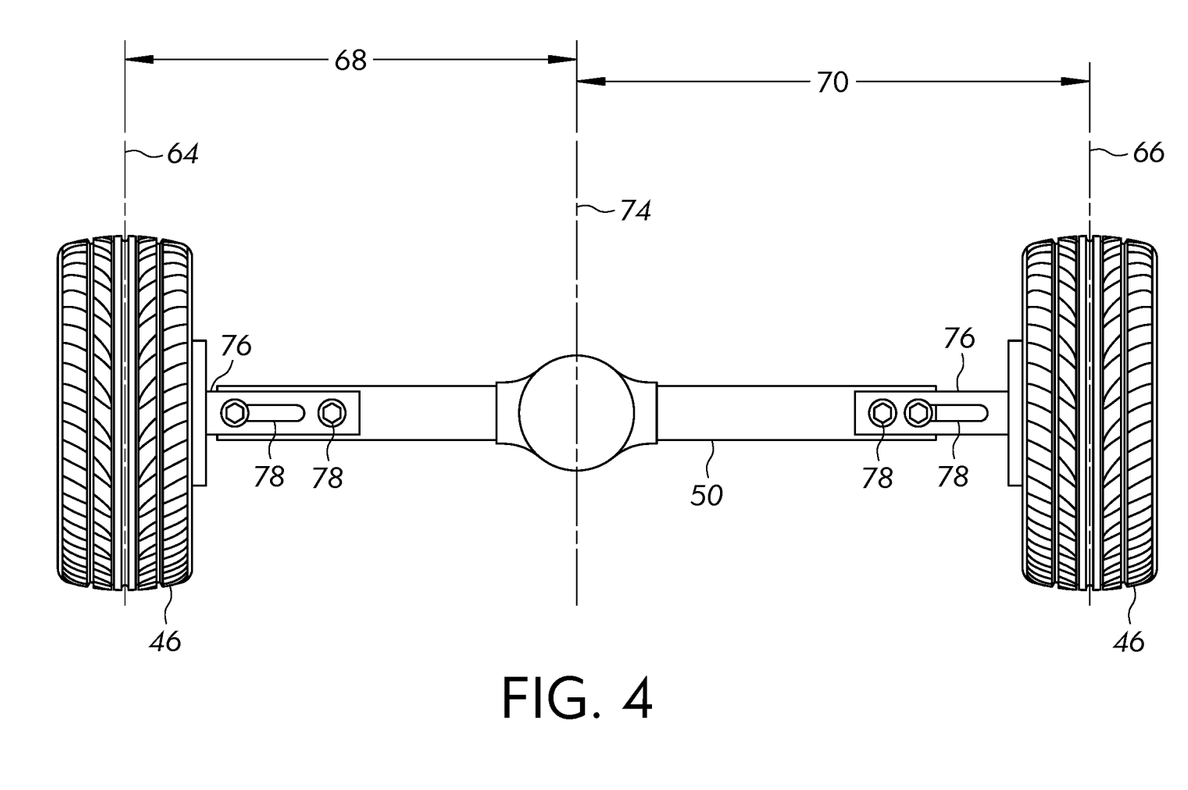
FIG. 4 is a schematic of an adjustable track width of the articulating beam axle of FIG. 3.

Turning to FIG. 4, the articulating beam 50 also allows for simple track width changes that accommodate relatively narrow widths and relatively wide widths. Track width can be defined from a centerline 64 of the right side ground engaging member 46 to the centerline 66 of the left side ground engaging member 46. For illustrative purposes, FIG. 4 shows ground engaging members 46 at different widths 68, 70 between the centerlines 64, 66 of the ground engaging members 46 to the centerline 74 of the utility vehicle 20. For example, dimension 68 (narrow) on the left side can be used for wheels and/or tires and dimension 70 (wide) on the right side can be used for track assemblies. In one example, the articulating beam 50 is a hollow axle that enables a tube-in-a-tube connection with the yoke 76. In another example, one or both of the articulating beam 50 and the yoke 76 can include a set of holes and/or slots 78 enabling manual changes to the track width using a threaded fastener connection. The hollow axles 50 and tubular frame also help provide buoyancy for the utility vehicle 20 because they are sealed via threaded plugs (not shown). As with the tubular frame members 24, the articulating beam 50 can comprise HSLA.

In another example of the utility vehicle 20 described above, the utility vehicle 20 includes articulating beam axles that transfer the vertical and lateral load reactions of the utility vehicle 20 that occur during normal operations, turning maneuvers, and side hill operations, from the traction motors (described below) through the ground engaging members 46 to the frame.

In another example of the utility vehicle 20, the utility vehicle 20 includes pivot beam axles (essentially ½ of an articulating beam 50 axle split at the pivot point 54) creating suspension elements that react to terrain variations independently from one another.

Figure 5A:
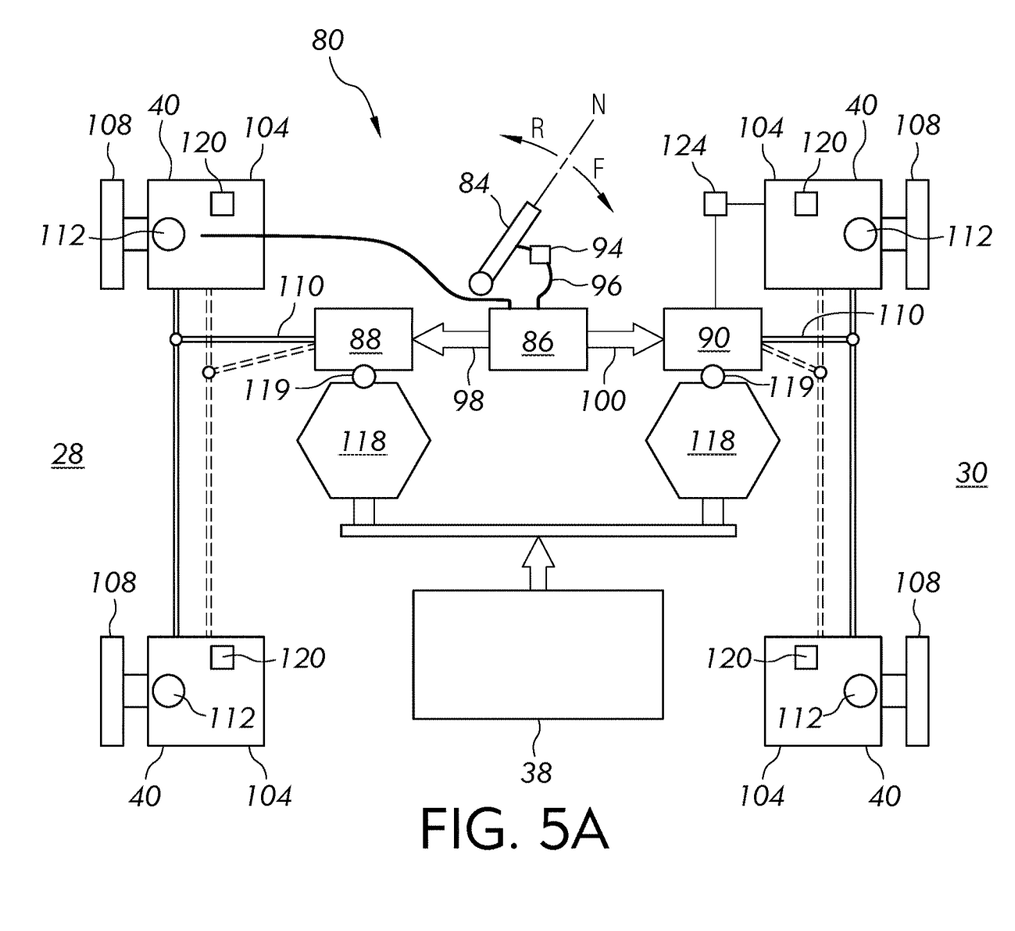
FIG. 5A is a schematic of one example power scheme of the utility vehicle of FIG. 1 showing a set of motors connected in parallel.

Turning to FIG. 5A, a schematic representation of an example drive system 80 of the utility vehicle 20 is shown. As previously discussed, the operator seating area 34 includes a steering control and a speed control for controlling travel speed and direction of the utility vehicle 20. In one example, the steering control and speed control can be one input device 84. The utility vehicle 20 includes a plurality of controllers 86, 88, 90 configured to receive input from the steering control and the speed control. During operation of the utility vehicle 20, an operator provides an input (e.g., physical motion of the input device 84 to direct travel speed and direction of the utility vehicle 20. At least one of the plurality of controllers 86, 88, 90 is configured to integrate a steering input received by the steering control with a speed input received by the speed control to effect rotation of the plurality of steerable structures 40 and effect rotation of the plurality of ground engaging members 46 (best seen in FIGS. 1 and 3). In the shown example, the steering control and the speed control have been unified into the input device 84, however, separate controls such as a steering wheel and a "gas pedal" can be provided in other examples. Alternatively, other control devices can be provided including, but not limited to: a pair of steering levers positioned adjacent to the lateral sides of the user, a joystick, or any other steering mechanisms.

Continuing with FIG. 5A, the input device can include a sensor 94 to determine the input provided by the operator and convert a physical motion to an electrical signal. Controller 86 is in electrical communication with the sensor 94 via connection 96. Controller 86 integrates the steering input and the speed input (now represented as an electrical signal) and determines appropriate rotation angles for the steerable structures 40 and rotation speeds for the ground engaging members 46. Controller 86 is in electrical communication with controllers 88, 90 via connections 98, 100 represented by arrows. Controller 88 dictates rotation of the steerable structures 40 and rotation of the plurality of ground engaging members 46 on one of the opposing lateral sides 28 of the utility vehicle 20 (i.e., the left side). Similarly, controller 90 conducts the same operations on the other of the opposing lateral sides 30 (i.e., the right side).

The utility vehicle 20 also includes a plurality of motors 104 connected to the plurality of steerable structures 40. The motors 104 are configured to drive the plurality of ground engaging members 46 at different speeds and in different directions. Any suitable motor can be used, including, but not limited to, electric drive motors, hydraulic drive motors hydrostatic drives, etc. Transfer of power to the ground engaging members 46 is accomplished by individual motors attached to steerable structures 40 connected to the articulating beam axles. The drive motors 104 incorporate hubs 108 with lug-bolts to allow wheel/tires and tracks to be directly attached to the drive motors 104. Track assembly pivoting allows each track assembly to climb over obstacles and follow terrain contours. Controllers 88, 90 are in electrical communication with the motors 104 via connections 110. FIG. 5A shows the plurality of motors 104 connected in parallel, while FIG. 5B shows the motors 104 connected in series.

In the shown example, the motors 104 can take the place of the steerable structures 40 and rotate about a kingpin 112. Each kingpin 112 can include a sensor 114 to determine the rotation angle of the motor 104, and this rotational position information is relayed back to the controller 86 via connection 116. In one example, only one kingpin 112 includes a sensor 114, for example, the front left kingpin 112.

Figure 5B:
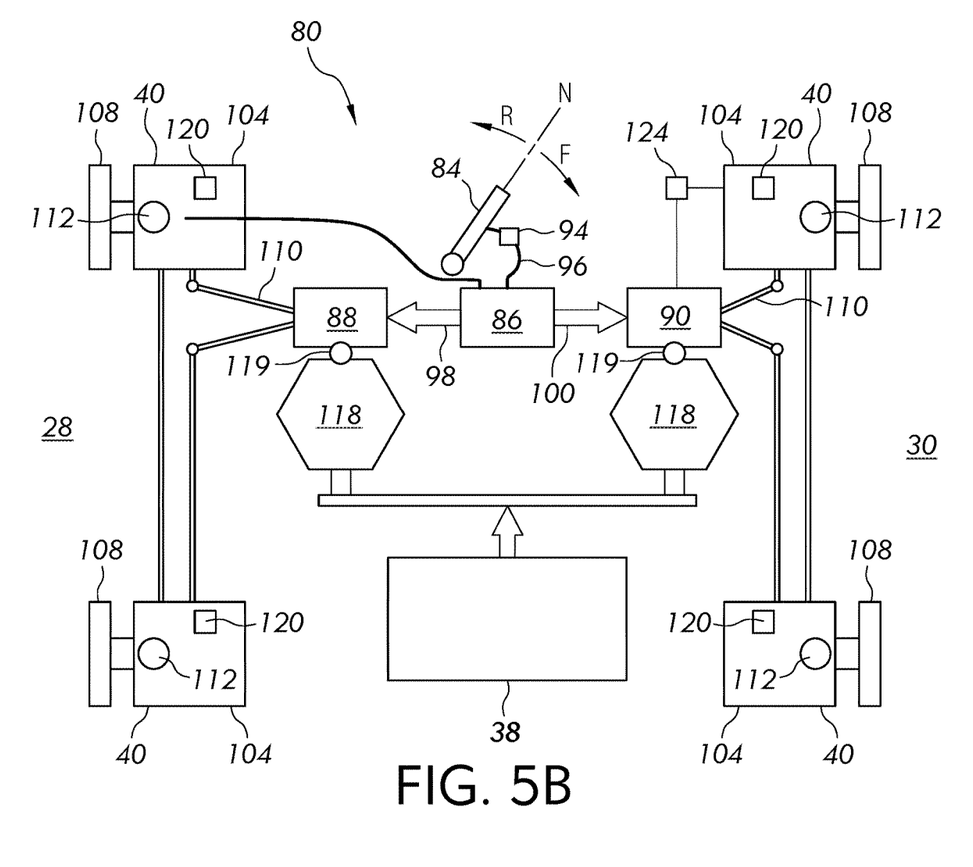
FIG. 5B is a schematic of one example power scheme of the utility vehicle of FIG. 1 showing a set of motors connected in series.

FIGS. 5A and 5B also show electrical generators 118 to convert mechanical energy from the power source 38 into electrical energy to be supplied to the control system of the utility vehicle 20. In some cases, the power source 38 can be batteries or a fuel cell, in which case the electrical generators 118 can be omitted.

As a brief summary of the drive systems shown in FIGS. 5A and 5B, one example includes an internal combustion engine or hybrid engine as power source 38; generator 118; an inverter 119; controllers 86, 88, 90; electric drive motors as motors 104; and braking mechanism 120 (described below). Another example includes an internal combustion engine or hybrid engine as power source 38; hydrostatic pump(s) 124; controllers 86, 88, 90; hydrostatic motors as motors 104; and braking mechanism 120. Yet another example includes batteries or fuel cells as power source 38; controllers 86, 88, 90; electric drive motors as motors 104; and braking mechanism 120. Various combinations of these components and drive systems are also contemplated.

In the described examples, the steering control, the speed control, the controllers 86, 88, 90, the steerable structures 40, and the motors 104 are configured to work together to control the rotational speed of all of the ground engaging members 46 based upon a steering angle input to steering control and based upon which of the opposing lateral sides 28, 30 a particular ground engaging member 46 is connected. Additionally, in some examples, feedback to the controllers 86, 88, 90 comes from speed sensors (not shown) which are sometimes integrated into the braking mechanisms 120, but sometimes they are integrated into the motors 40.

In a more particular example, the steering control, the speed control, the controllers 86, 88, 90, the plurality of steerable structures 40, and the motors 104 are configured to work together to, during a turning operation, reduce the rotational speed of the ground engaging members 46 connected to the inner lateral side of the utility vehicle 20 in order to reduce a turning radius of the utility vehicle 20. In other words, during a utility vehicle turn, the ground engaging members 46 on the inside of the turn can experience a braking operation from a braking mechanism 120. Any suitable braking mechanism can be used, including, but not limited to, friction brakes, regenerative brakes, or slowing of a hydrostatic device.

In yet another example, the steering control, the speed control, the controllers 86, 88, 90, the plurality of steerable structures 40, and the motors 104 are configured to work together to, during a turning operation, to effect Ackermann steering on all of the ground engaging members 46.

Figure 6:
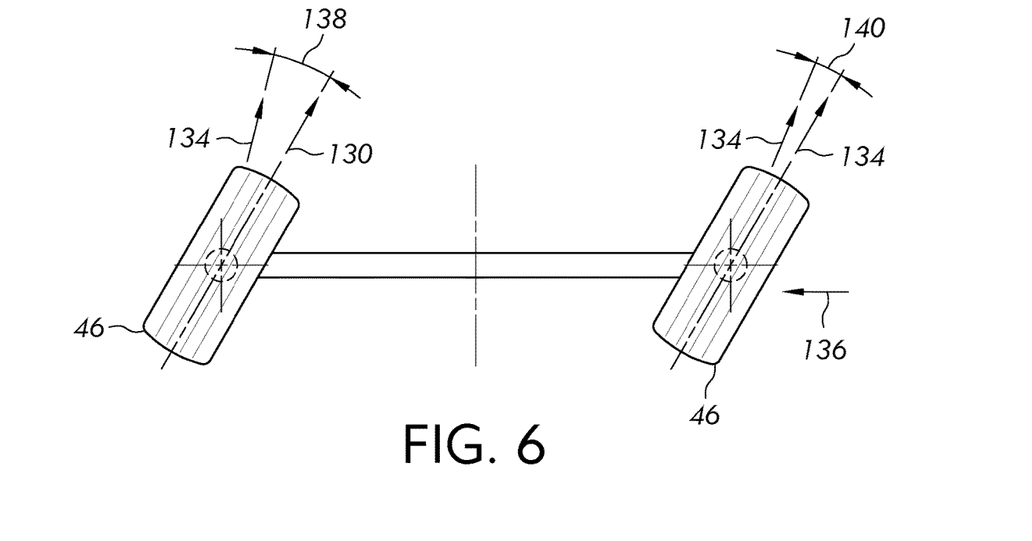
FIG. 6 is a graphical representation of steering wheels of the utility vehicle.

The steering geometry shown in FIG. 6 results in the inside ground engaging member 46 turning a smaller radius than the outside ground engaging member 46. This allows the utility vehicle 20 to travel around a curve without scrubbing the tires or track assemblies if the steering linkage is designed to provide "Neutral" or "0" Ackermann. The steering linkage does not need to produce true Ackermann which is a combination of the steered angle and the tire slip angle produced by the cornering force. Arrows 130 represent the steered angle while arrows 134 represent the direction of travel. Arrow 136 represents a cornering force. The slip angle 138 on the outside ground engaging member 46 (left side) is greater than the slip angle 140 of the inner ground engaging member 46 (right side) and this produces varying degrees of dynamic Ackermann effect.

Figure 7:
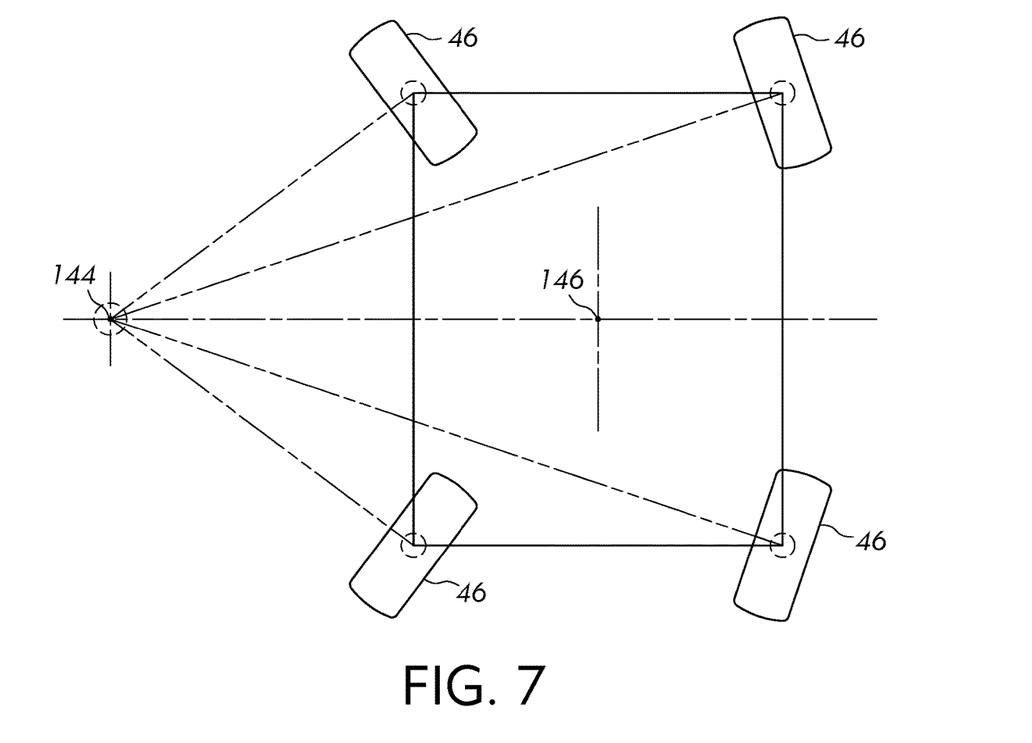
FIG. 7 is a graphical representation of the turning radius for the utility vehicle.

There can be significant de-tracking forces developed on the described track assemblies 48 during turning maneuvers, but the exemplary utility vehicle 20 employs all-wheel-steering so that the steering angles can be minimized to about 70% of that necessary for single-axle steering systems. For the example shown in FIGS. 6-8, less than 35 degrees inside and about 18 degrees outside for a 10-foot diameter tire circle (effective radius of 50-inches with 49-inch track width and 66-inch wheelbase), compared to 48 degrees inside and 31 degrees outside for a single steer axle (same track and wheelbase, effective radius of 60-inches). As shown in FIG. 7, the typical pivot point of a vehicle is represented by point 144 while the point for a minimum turning radius (0°) is represented by point 146.

Figure 8:
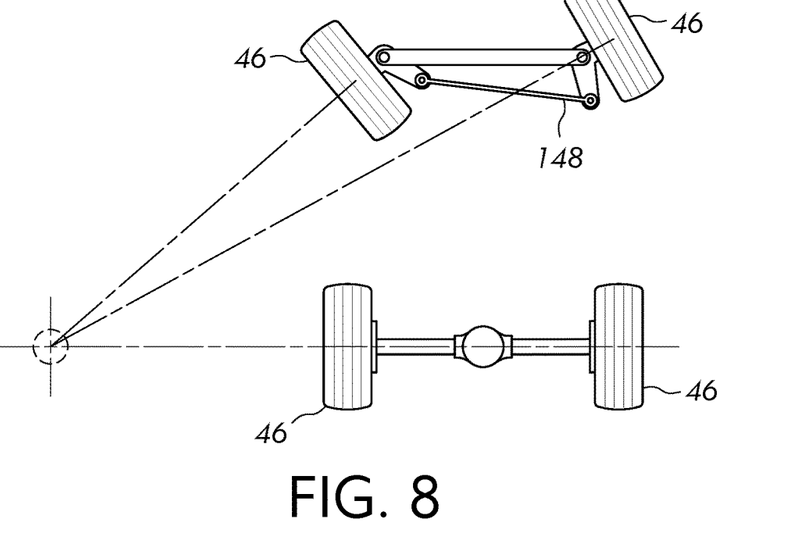
FIG. 8 is a schematic of the turning radius for the utility vehicle showing an Ackermann geometry.

Yaw reactions of the track assemblies are resisted by the steerable structures 40. The steerable structures 40 and linkage on each articulating beam 50 axle provide Ackermann steering geometry. As the utility vehicle 20 is steered, the steerable structures 40 on the inside and outside of each articulating beam 50 axle are controlled via simple unequal parallelogram linkage 148 as shown in FIG. 8 and the speed of the inside wheel/tires or track motors 104 are reduced to the proper speed for the steer angle (reacting in a manner similar to that for automotive stability/traction control—see included equations below) of the front (or the rear for center-axis AWS) kingpin 112 best seen in FIGS. 5A and 5B. Examples of the utility vehicle 20 provide a provision to reduce the vehicle turning radius to less than that of the following example by further reduction of the speed of the inside wheel/tire or motors 104, as dictated by the below equations. This is accomplished by continuing to turn the steering wheel or steering input device in the direction of the turn to create a signal to reduce the speed of the motors 104 on the inside of the turn (essentially dynamic braking). The speed reduction is limited to a pre-established value (above "0" mph) to maintain traction, minimize terrain deformation and to enhance control.

In one example, the utility vehicle 20 includes Ackermann steering geometry provided at each beam axle by unequal parallelogram linkage that can be manually or power (electric or hydraulic) activated or controlled via wired or fluid power means.

In another example of the utility vehicle 20 described above, the utility vehicle 20 includes no understeer or over-steer due to all-wheel-steering and Ackermann steering geometry, and no spinning or slipping during turns due to accurate motor speed control provided by synchro-steer technology as described in patents such as U.S. Pat. Nos. 7,992,659, 7,914,022, 8,474,841, and related patents, for example.

In another example, the utility vehicle 20 includes synchro-steer technology to control the speed of the steered wheel/tires or tracks based on the steer angle of one of the kingpins 112 (best seen in FIGS. 5A and 5B, and to provide a further speed reduction of the inside wheel/tires or tracks to decrease the utility vehicle 20 turning radius.

Figure 9:
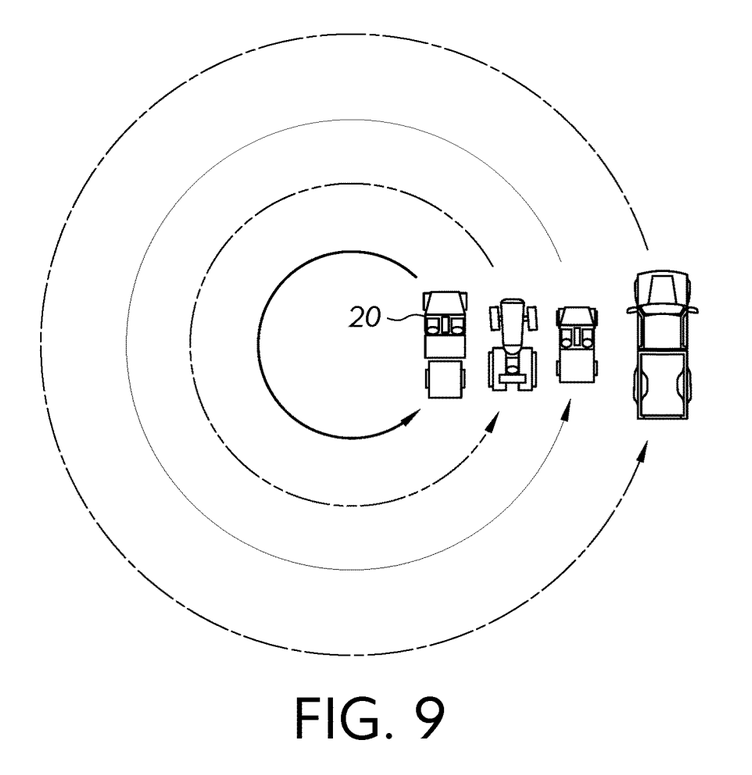
FIG. 9 shows the turning radius for various vehicles.

FIG. 9 shows the utility vehicle 20 providing 8- to 10-foot circle turning radii without the speed restriction of the inside wheel/tires or tracks, and the inside wheel/tire or track speed reduction reduces the circle to 4-feet or less, compared to other vehicles shown.

Figure 10A:
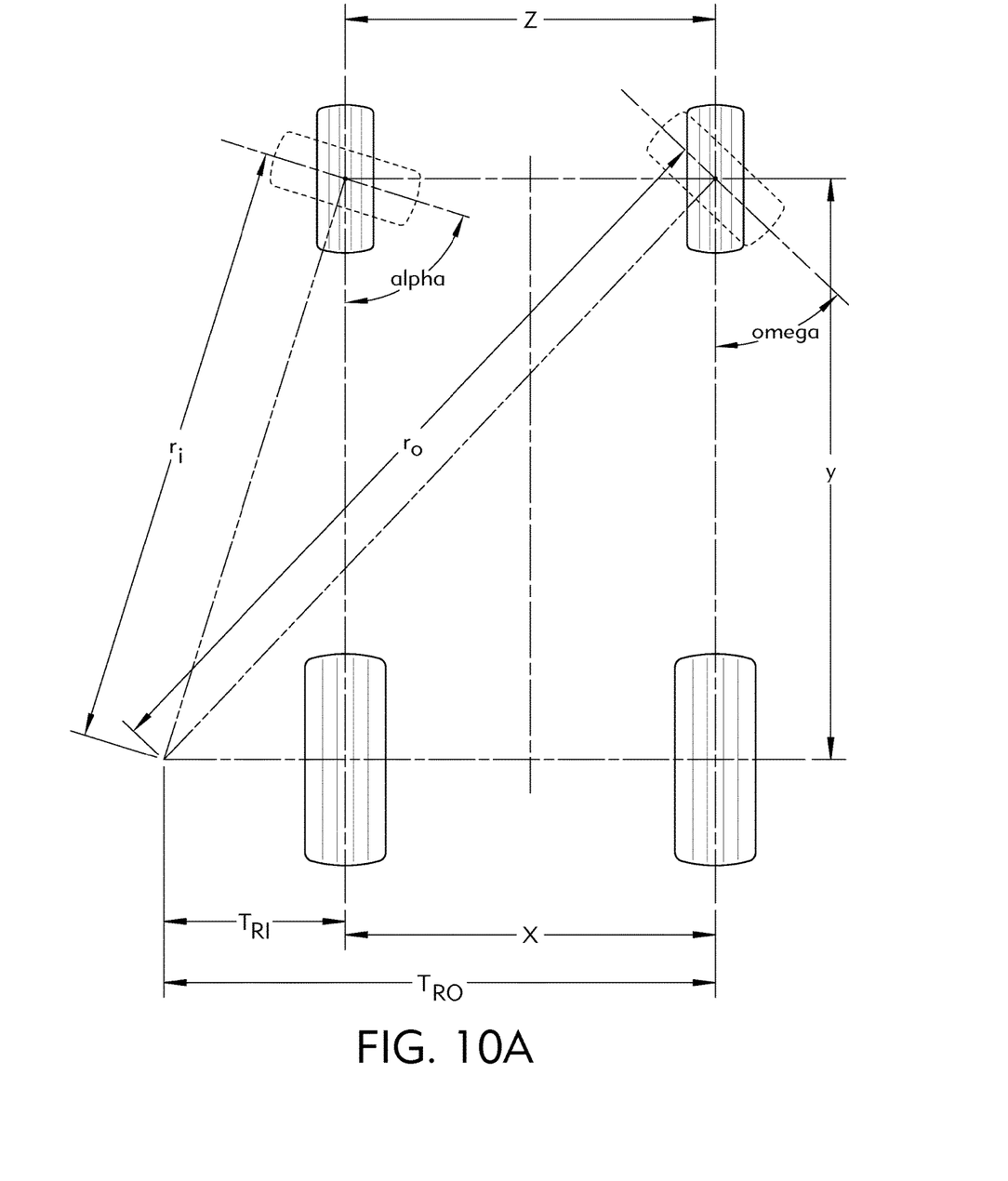
FIG. 10A is a schematic of Ackermann steering geometry for a two-wheel steer vehicle.
Figure 10B:
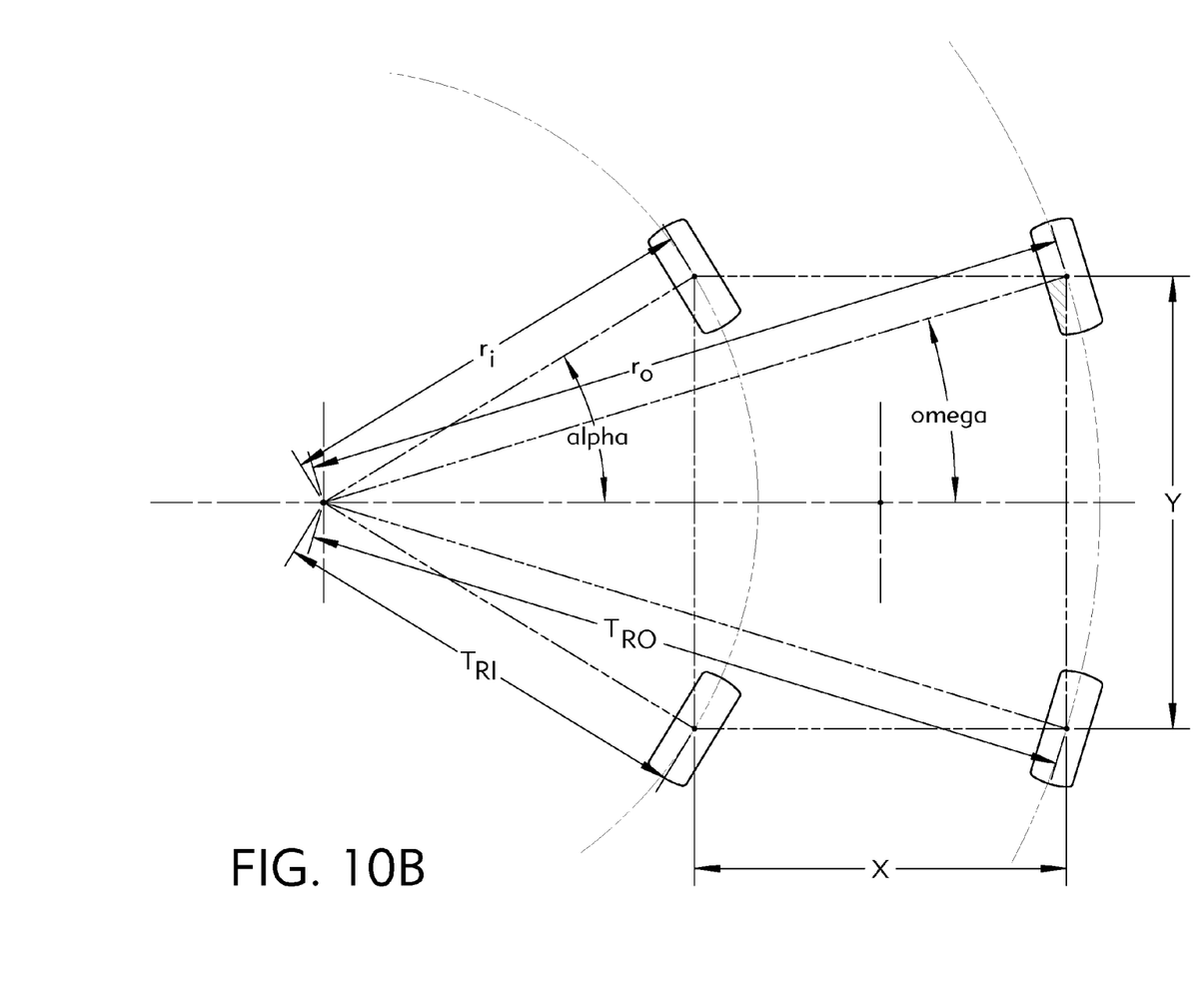
FIG. 10B is a schematic of Ackermann steering geometry for a four-wheel steer vehicle.

Equations for Ackermann Steering (two-wheel steering) using Synchro-Steer Technology referring to FIG. 10A:

$T_{Ri} = \tan(90° - \alpha) * y - o_{rear}$     Equation 1:

$T_{Ro} = T_{Ri} + x$     Equation 2:

$r_i = \text{SQRT}[y^2 + (T_{Ri} + o_{rear})^2] - o_{front}$     Equation 3:

$r_o = \text{SQRT}[y^2 + (T_{Ro} - o_{rear})^2] + o_{front}$     Equation 4:

$\omega = 90° - \tan^{-1}[(T_{Ro} - o_{front})/y]$     Equation 5:

Axle Ratio $= T_{Ro}/T_{Ri}$     Equation 6:

$\alpha_{u\text{-}turn} = 90° - \tan^{-1}(o_{rear}/y)$     Equation 7:

$\alpha_{zero\text{-}turn} = 90° - \tan^{-1}[(-x/2 + o_{rear})/y]$     Equation 8:

$\text{MPH}_{inside} = $ Outside Wheel Speed/Axle Ratio     Equation 9:

$\text{MPH}_{outside} = \text{Full}_{FWD} - [(\text{Full}_{FWD}/2)/(\alpha_{zero\text{-}turn} - \alpha_{slowdown})*(\alpha_{current} - \alpha_{slowdown})]$     Equation 10:

$\text{MPH}_{outside} = \text{Half}_{FWD} - [(\text{Half}_{FWD}/2)/(\alpha_{zero\text{-}turn} - \alpha_{slowdown})*(\alpha_{current} - \alpha_{slowdown})]$     Equation 11:

$\text{MPH}_{outside} = \text{Full}_{REV} - [(\text{Full}_{REV}/2)/(\alpha_{zero\text{-}turn} - \alpha_{slowdown})*(\alpha_{current} - \alpha_{slowdown})]$     Equation 12:

$\text{MPH}_{outside} = \text{Half}_{REV} - [(\text{Half}_{REV}/2)/(\alpha_{zero\text{-}turn} - \alpha_{slowdown})*(\alpha_{current} - \alpha_{slowdown})]$     Equation 13:

$\text{MPH}_{front\ inside} = (r_i/T_{Ro}) * \text{MPH}_{rear\ outside}$     Equation 14:

$\text{MPH}_{front\ outside} = (r_o/T_{Ro}) * \text{MPH}_{rear\ outside}$     Equation 15:

Equations for Ackermann Steering (four-wheel steering) using Synchro-Steer Technology referring to FIG. 10B:

$\text{MPH}_{front\ inside} = \text{MPH}_{rear\ inside} = (r_i/r_o) * \text{MPH}_{front\ or\ rear\ outside}$     Equation 16:

$\text{MPH}_{front\ outside} = \text{MPH}_{rear\ outside} = (r_o/r_i) * \text{MPH}_{rear\ or\ front\ inside}$     Equation 17:

$r_i = T_{Ri} \tan(90° - \alpha) * Y - O_{rear}$     Equation 18:

$\sin(\alpha) = (Y/2)/r_i$     Equation 19:

$r_o = T_{Ro} = T_{ri} + X = r_i + X$     Equation 20:

$\sin(\omega) = (Y/2)/(r_i + X) = (Y/2)/T_{Ro}$     Equation 21:

Where: X is the track width, Y is the wheelbase, O is the wheel offset, $\alpha$ is the steer angle on the inside ground engaging member(s), $\omega$ is the steer angle on the outside ground engaging member(s), $r_i$ is the turn radius on the front inside ground engaging member, $r_o$ is the turn radius on the front inside ground engaging member, $T_{Ri}$ is the turn radius of the rear inside ground engaging member, $T_{Ro}$ is the turn radius of the rear outside ground engaging member, $\text{MPH}_{inside}$ is the wheel speed on the inside ground engaging member, and $\text{MPH}_{outside}$ is the wheel speed on the outside ground engaging member.

Other benefits derived from the All-Wheel Drive (AWD) and All-Wheel Steering (AWS) features include: minimization of the steer angles required to negotiate turns, thereby reducing the axial loading at the wheel/tires or tracks. AWS allows the front or rear axles to be controlled independently, thereby allowing front wheel or rear wheel steering. AWS allows steering at each kingpin 112 to be individually controlled, thereby enabling "crab-steering" and zero-turn maneuvers.

In another example of the utility vehicle 20 described above, the utility vehicle 20 exhibits a highly stable platform due to its relatively large base (wide track and long wheelbase) and AWS. In another example, the utility vehicle 20 includes relatively high traction due to AWD and large contact areas provided by the pneumatic wheel/tires, non-pneumatic wheel/tires, or track assemblies.

The utility vehicle 20 can include embodiments that are supported via pneumatic or non-pneumatic tires of a wheel assembly or corresponding track assemblies, and the utility vehicle 20 may or may not integrate axles and suspension elements. Steering control of the proposed utility vehicle can be provided by wheel/tires on front/rear located axles or suspension elements (generally Ackermann geometry driven by transaxles incorporating lockable differentials), by all wheel steering via wheel/tires on all axles or suspension elements (these can incorporate transaxles or individual wheel motors), or by machine articulation (generally driven by transaxles incorporating lockable differentials).

Traction drive is provided in numerous configurations of the utility vehicle 20 with mechanical power supplied by spark-ignition or compression-ignition engines or electric power provided by stored energy devices. Variations can include mechanical transmissions, continuously variable transmissions (CVT), hydrostatic pumps, electric drives, and hybrids.

The example utility vehicle 20 shown in FIG. 1 can also include a frame constructed of buoyant tubular members, an occupant protection system (OPS), bench or bucket seating, highly efficient electric generator/alternators, controllers and electric motors powered by stored-energy or hybrid power generation devices (with spark- or compression-ignition engines), service and park brake systems, a steering system that controls the speed and direction of the steerable wheels or tracks based on steer-angle input, and a speed/directional control system (linkage or system module with wire harness), and a suspension system.

In another embodiment of the utility vehicle 20 described above, the utility vehicle 20 includes an amphibious capability due to the compartmental structures surrounding the operator and passenger and separately for the hybrid and other power generation devices providing the buoyancy necessary for machine floatation.

Example utility vehicle configuration:
Length
   90-in (end of tracks), wheelbase=76-in
Width
   63-in at wheel/track edges (72-in with extensions), track=52-in (61-in with tracks)
Height
   64-in (top of OPS)
Ground clearance
   10-in @ center of tunnel area
Weight (curb)
   1,100 lb (base configuration)
   1,900 lb (operator, passenger, cargo)
Fuel capacity
   7 gallons (U.S.) gasoline or diesel, 33 lb LPG
G.V.W.
   2,200 lb
Tow Capacity
   1,500/200 lb
Cargo box
   Standard configuration (24-in L×48-in W×10-in H)
   350 lb load (maximum)
Battery—Starting
   360 CCA type U1
Electrical system
   12 VDC with negative ground
OPS Enclosure
   Includes gull-wing entry/egress doors and designated steps
   Two seats for $5^{th}$ percentile-$95^{th}$ percentile male occupants
      High-back bucket seats for two 215 lb occupants
   Operator Protection System
      OPS complies with SAE J2258 and ANSI B71.9
      3-point occupant restraints comply with SAE J2258 and ANSI B71.9
   12 VDC power outlet
   inside mirror
   cup-holder
   Optional full weather cab
   Optional work lights
Engine
   SI Engine—55 kW (72 hp) @ 6200 rpm
   SI Engine—29.9 kW (40 hp) @ 3600 rpm
   CI Engine—42 kW (56 hp) @ 2600 rpm (DI),
   Dual element remote located air filtration
   Single exhaust (with after-treatment)
      EPA P-3 & CARB T-IV Final compliant
   Sound power 80 dbA
   EMC compliant to Directive 97/24/EC Chapter 8
Electric or Hydrostatic Traction Drive
   Acceleration
      19 mph in 6 sec
   Maximum speed
      45 mph on 0% grade
      20 mph on 20% grade
      5 mph on 35 degree grade
   Drawbar pull
      1500 lb @ 5 mph
   Traction drive system electric or hydrostatic
      40-45 kW generation at 430 VDC
      20-22 kW generation at 240 VAC
      Tandem 16 cc/rev pump
      Four 5-6 kW 1-phase 240 VAC motors, 5-lug 4.5" B.C., +/−0 to 500 RPM
      Four 140 cc/rev generator motors, 5-lug 4.5" B.C. +/−0 to 500 RPM
   Directional control
      Treadle-type with separate foot pedal controls for Forward and Reverse
   Speed control
      Foot pedal controls effective gear ratio of traction drive
      SEVCON controllers
   Braking
      Service—regenerative and mechanical friction
      Parking—positive locking
Track & Suspension
   Tracks (5-lug 4.5" B.C.)
      11 in" wide
      Contact area=11 in×20 in×4=880 in$^2$
      Ground pressure=1900 lb/880 in$^2$=2.16 lb/in$^2$
      Construction/material—rubber with steel and polyester cord reinforcement
      Inside Rubber ASTM D2000 2AA 914 (Duro, Shore A: 90±5)
      Fabric
      Steel Cord
      Structural Rubber ASTM 02000 2AA 614 (Duro, Shore A: 60±5)
      Fabric
      Outside Rubber ASTM 02000 2AA 614 (Duro, Shore A: 65±5)
   Track suspension
      Articulating axles front and rear, extension feature adds 12" width
      Adjustable-rate coil-spring-over-shock suspensions/track
      optional adjustable-rate air-springs
Steering
   All Wheel steering coupled to Synchro-Steer
   Steering wheel directional control—Left turn (CCW) & Right turn (CW)
   Input to Synchro-Steer to control individual track speed & direction
   All Wheel Steer angle for turns up to 5-ft radius
   Synchro-Steer integrated for turns to 2-ft radius
For 60" inside radius with 52" track and 76" wheelbase
   inside steer angle=33.4 deg
   outside steer angle=17.6 deg While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended

The invention claimed is:

1. A utility vehicle comprising:
   a frame, wherein said frame includes two opposing lateral sides;
   a power source connected to said frame;
   a plurality of steerable structures rotatably connected to said frame;
   a plurality of ground engaging members operatively connected to said plurality of steerable structures;
   an operator seating area, wherein a steering control and a speed control for controlling said plurality of ground engaging members are located within said operator seating area;
   a plurality of controllers configured to receive input from said steering control and said speed control; and
   a plurality of motors connected to said plurality of steerable structures, wherein said motors are configured to drive said plurality of ground engaging members at different speeds and in different directions,
   wherein at least one of said plurality of controllers is configured to integrate a steering input received by said steering control with a speed input received by said speed control to effect rotation of said plurality of steerable structures and effect rotation of said plurality of ground engaging members,
   wherein said steering control, said speed control, said plurality of controllers, said plurality of steerable structures, and said plurality of motors are configured to work together to control the rotational speed of all of said plurality of ground engaging members based upon a steering angle input to said steering control and based upon which of said opposing lateral sides a particular ground engaging member of said plurality of ground engaging members is connected to effect steering of said utility vehicle.

2. The utility vehicle according to claim 1, wherein said plurality of ground engaging members comprise pneumatic tires.

3. The utility vehicle according to claim 1, wherein said plurality of ground engaging members comprise non-pneumatic tires.

4. The utility vehicle according to claim 1, wherein said plurality of ground engaging members comprise track drives.

5. The utility vehicle according to claim 1, wherein said steering control, said speed control, said plurality of controllers, said plurality of steerable structures, and said plurality of motors are configured to work together to, during a turning operation, reduce the rotational speed of a number of said plurality of ground engaging members connected to an inner lateral side of said opposing lateral sides of said frame in order to reduce a turning radius of said utility vehicle.

6. The utility vehicle according to claim 1, wherein said plurality of motors are connected in parallel.

7. The utility vehicle according to claim 1, wherein said plurality of motors on each opposing lateral side of said utility vehicle are connected in series.

8. The utility vehicle according to claim 1, further comprising a generator.

9. The utility vehicle according to claim 1, wherein said power source is selected from the group consisting of an internal combustion engine, batteries, and fuel cells.

a plurality of braking mechanisms connected to said plurality of steerable structures, wherein said plurality of braking mechanisms are configured to apply a braking force to said plurality of ground engaging members;
   an operator seating area, wherein a steering control and a speed control for controlling said plurality of ground engaging members are located within said operator seating area;
   a plurality of controllers configured to receive input from said steering control and said speed control; and
   a plurality of motors connected to said plurality of steerable structures, wherein said motors are configured to drive said plurality of ground engaging members at different speeds and in different directions,
   wherein at least one of said plurality of controllers is configured to integrate a steering input received by said steering control with a speed input received by said speed control to effect rotation of said plurality of steerable structures and effect rotation of said plurality of ground engaging members,
   wherein said steering control, said speed control, said plurality of controllers, said plurality of steerable structures, and said plurality of motors are configured to work together to effect Ackermann steering on all of said plurality of ground engaging members,
   wherein half of said plurality of ground engaging members are located on one of said opposing lateral sides and experience a braking force when on an inner side of a turning operation.

* * * * *